US006170807B1

(12) United States Patent
Eto

(10) Patent No.: US 6,170,807 B1
(45) Date of Patent: Jan. 9, 2001

(54) INNER SPRINGS FOR USE IN FURNITURE AND BEDDING AND A PRODUCING METHOD THEREFOR

(75) Inventor: Hiroyuki Eto, Kawasaki (JP)

(73) Assignee: Matsushita Industrial Co., Ltd., Osaka (JP)

( * ) Notice: Under 35 U.S.C. 154(b), the term of this patent shall be extended for 0 days.

(21) Appl. No.: 09/223,713

(22) Filed: Dec. 31, 1998

(30) Foreign Application Priority Data

Jul. 31, 1998 (JP) .................................................. 10-217814

(51) Int. Cl.[7] .......................................................... F16F 3/00

(52) U.S. Cl. ................................. 267/103; 267/93; 5/720

(58) Field of Search ..................................... 267/103, 180, 267/91, 92, 85, 95; 5/720, 655.8, 716, 655.7, 727

(56) References Cited

U.S. PATENT DOCUMENTS 3,626,523 * 12/1971 Robins ..................................... 5/345
5,444,905 8/1995 St. Clair .
5,740,597 4/1998 Eto ........................................... 29/33
5,868,383 * 2/1999 Codos .................................... 267/80
5,987,678 * 11/1999 Ayers ....................................... 5/720

FOREIGN PATENT DOCUMENTS 0 967 031 12/1999 (EP) .
9-173673 7/1997 (JP) .

* cited by examiner

*Primary Examiner*—Robert J. Oberleitner
*Assistant Examiner*—Xuan Lan Nguyen
(74) *Attorney, Agent, or Firm*—Wenderoth, Lind & Ponack, L.L.P.

(57) ABSTRACT

An inner spring, for use in furniture and bedding, comprises coil springs which are encased in cylindrical casings having a predetermined number of spring casing portions, and which are continuously arranged in parallel. The axes of the coil springs are arranged in parallel, and at least a part of the coil springs encased in the spring casing portions are given different repulsions by varying their pitches and are set in place in the cylindrical spring casings to form a row of inner springs.

7 Claims, 8 Drawing Sheets

INNER SPRINGS FOR USE IN FURNITURE AND BEDDING AND A PRODUCING METHOD THEREFOR

BACKGROUND OF THE INVENTION

1. Field of the Invention

The present invention relates to an inner spring to be fitted inside furniture including chairs and sofas, and bedding including mattresses for beds.

It is noted that the terms "furniture" and "bedding" used herein are intended to embrace any seats used in, for example, trains and motorcars and these terms are used, in the broad sense without being limited to the examples above.

2. Description of the Prior Art

In a general type inner spring producing apparatus, expensive and highly resilient, oil tempered, wire rods are used to enhance resilience or repulsion and durability of coil springs. This is because coil springs made of general wire rods present problems in resilience and durability.

However, the oil-tempered wire rods are strong in resilience, thus presenting a problem in that the coil springs are produced at much expense in time and labor. In addition, since those coil springs are low in production and yet the wire rods are expensive, a problem of increasing manufacturing costs is presented.

In general, a row of cased coil springs is produced by the method that each of the coil springs, which are produced continuously by the coil spring producing apparatus, is inserted in order between a non-woven fabric or sheet as folded in half The non-woven fabric or sheet is sealed. In this method, each individual cased coil spring cannot be changed in diameter.

To allow the row of coil springs to have partially different resilient forces (spring rates) with respect to a direction of a length L of, for example, a mattress for a bed by the conventional method, it is required that a variety of rows of inner springs be prepared. Each row of inner springs has encased coil springs which have different diameters. Rows of inner springs encasing coil springs of required diameters for required resilient forces are selected so as to be properly arranged in the widthwise direction W and are connected in order. Thus, the mattress of the bed as shown in FIG. 12 is formed.

With this conventional method, a plurality of apparatuses specialized for required diameters of the wire rods are needed to produce a plurality of rows of cased coil springs including coil springs having different diameters. In addition, the lengths of the rows of cased coil springs must be disadvantageously changed in accordance with variations in width W of the mattresses.

To solve these problems, the applicant has previously proposed an inner spring producing apparatus in U.S. Pat. No. 5,740,597 (Japanese Laid-open Patent Publication No. Hei 9-173673). This apparatus which is designed so that the coil springs are energized to be heated so as to be hardened, and are sequentially inserted into cylindrical casings having a predetermined number of spring casing portions which are continuously formed in parallel.

However, the coil springs produced by the inner spring producing apparatus previously proposed by the applicant as well as by the above-described general type ones are all uniform in resilient force (spring rate). Because of this, the mattress, in which a plurality of rows of conventional coil springs, each having a uniform resilient force, are connected, becomes uniform in resilient force over the whole area.

However, the distribution of weight through the mattress is not uniform, as illustrated in FIG. 12, which shows that the mattress is weighted lightly at its portions 34, 35 corresponding to the head and legs, but is weighted heavily at its portions 36 corresponding to the trunk. Thus, the mattresses has a disadvantage of not being suitable for the non-uniform distribution of weight.

One possible approach for allowing the coil springs to have different resilient forces to suit such a non-uniform distribution of weight is to use wire rods having different diameters for the coil springs. But, in this case, a plurality of coil spring producing apparatuses specialized for required diameters of individual wire rods are needed for producing the coil springs. This presents a further problem of needing a large space in a work-shop for installation of machines, storage of a variety of wire rods and the like.

In addition, each of the coil springs separately produced by the coil spring producing apparatuses must be adequately controlled to be accurately held in position in the spring casing portions of the cylindrical casings. Thus, further problems of needing much time and labor to reduce productivity and of being high in probability of miss-casing arise. Consequently, quality and reliability are reduced.

Another approach is that various kinds of springs of different diameters aligned in rows (the coil springs cased in each row of inner springs are all equal in diameter) are produced by a plurality of inner spring producing apparatuses. Proper rows of inner springs encasing coil springs of required diameters are selected and are connected so that they can be arranged in the widthwise direction W of the mattress, as shown in FIG. 13. This approach can produce resilient forces partially different with respect to the length L of the mattress, but this still has a disadvantage that the lengths of the rows of cased coil springs must be changed in accordance with variations in width of the mattresses.

Thus, various problems in addition to the above-described problems are created.

In order to solve the problems mentioned above, the applicant previously proposed "inner springs fit inside furniture and bedding and a producing method therefor" in U.S. patent application Ser. No. 09/126,446 (Japanese Patent Application No. Hei 10(1998)-58449).

The inner spring producing apparatus previously proposed by the applicant in the U.S. Pat. application Ser. No. 09/126,446 is provided with a energizing type hardening device which is structured so as to control the time for the coil spring to be energized for the hardening to provide varied resiliency for the coil springs. This proposed inner spring producing apparatus is epoch-making in that it can provide coil springs having various resiliencies while producing the coil springs for the inner springs, so as to provide partly varied support with respect to a lengthwise direction L of a mattress. This advantageous effect can never be produced by the conventional type of inner spring producing apparatus with no energizing type hardening device. In other words, it can never be produced without newly introducing the inner spring producing apparatus having the energizing type hardening device.

SUMMARY OF THE INVENTION

In accordance with the above disadvantages involved in the prior art, the present invention has been made. It is the object of the invention that varied resiliency of the coil springs in the inner springs can be provided even by the conventional type of inner spring producing apparatus having no hardening device. In addition, a further increased difference in resiliency can be provided by the inner spring producing apparatus having the hardening device.

To accomplish the object, the present invention provides a novel inner spring, for use in furniture and bedding, comprising coil springs which are cased, with their axes arranged in parallel, in cylindrical spring casings having a predetermined number of spring casing portions continuously arranged in parallel. At least a part of the coil springs cased in the spring casing portions are given different resiliencies by varying their pitches, and are set in place in the cylindrical spring casings to form a row of inner springs.

The coil springs cased in the spring casing portions may be individually or selectively formed at uneven pitches between their coils.

The present invention also includes a process for producing an inner spring for use in furniture and bedding, comprising coil springs which are formed from a wire rod in a coiled form in a coil spring producing step. The coil springs are encased, with their axes arranged in parallel, in cylindrical casings having a predetermined number of spring casing portions continuously arranged in parallel. The process comprises the step of varying the pitches of the coil springs by means of pitch setting means, before or after the wire rod is formed into the coiled form in the coil spring producing step. Thus, at least a part of the coil springs inserted in the cylindrical casings in a row of inner springs are made different in repulsion.

In the process for producing an inner spring for use in furniture and bedding, the coil springs cased in the spring casing portions may be individually or selectively formed at uneven pitches between their coils by means of the pitch setting means.

Other objects, features and advantages of the invention will be fully understood from a consideration of the following description taken in connection with the accompanying drawings.

DETAILED DESCRIPTION OF THE INVENTION

Referring now to the accompanying drawings, examples of the preferred embodiment of the present invention, directed to inner springs for use in furniture and bedding and a producing method therefor, will be described below. It is to be understood, however, that the scope of the invention is by no means limited to the illustrated embodiments.

Figure 1:
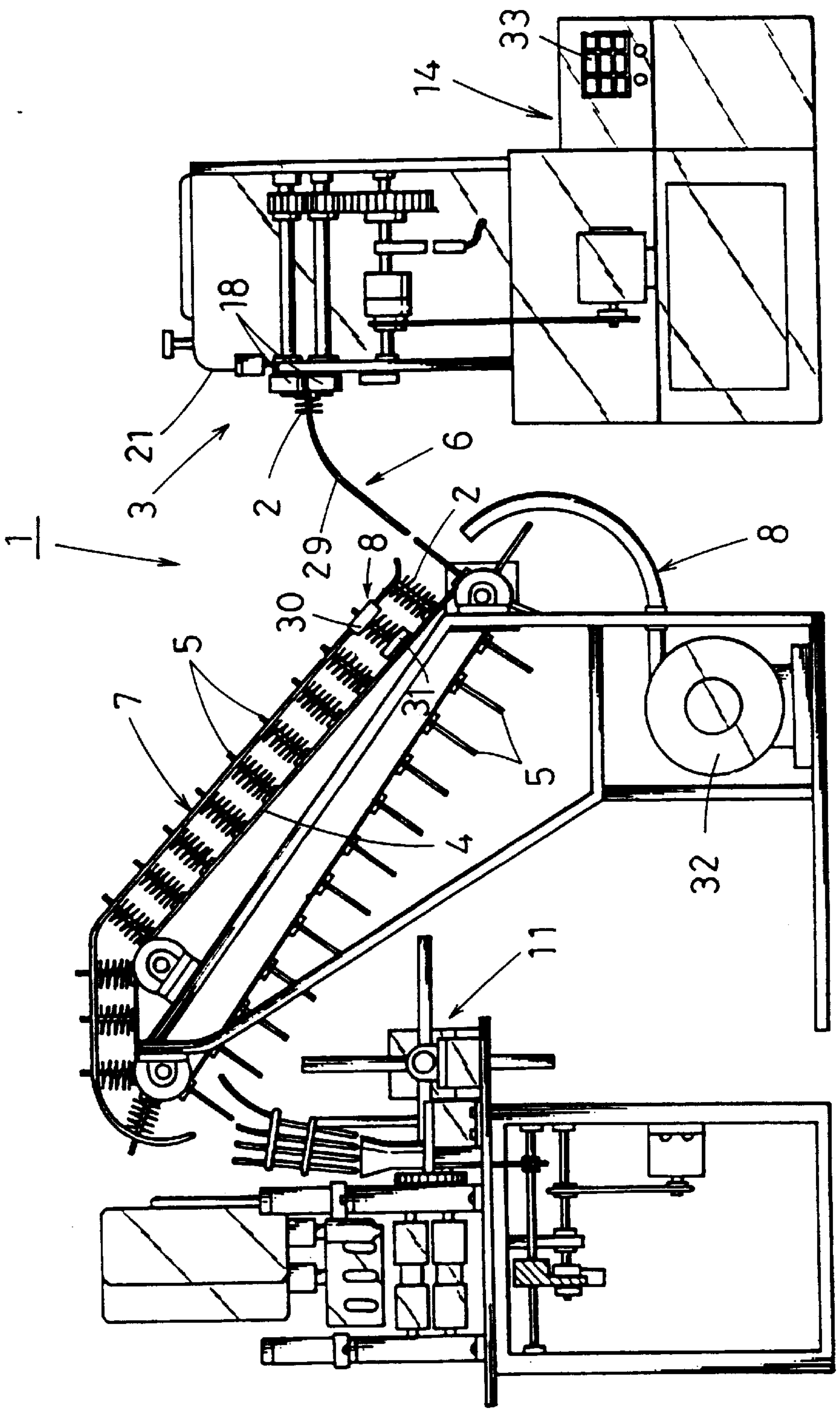
FIG. 1 is a schematic side view of an inner spring producing apparatus of the invention.
Figure 2:
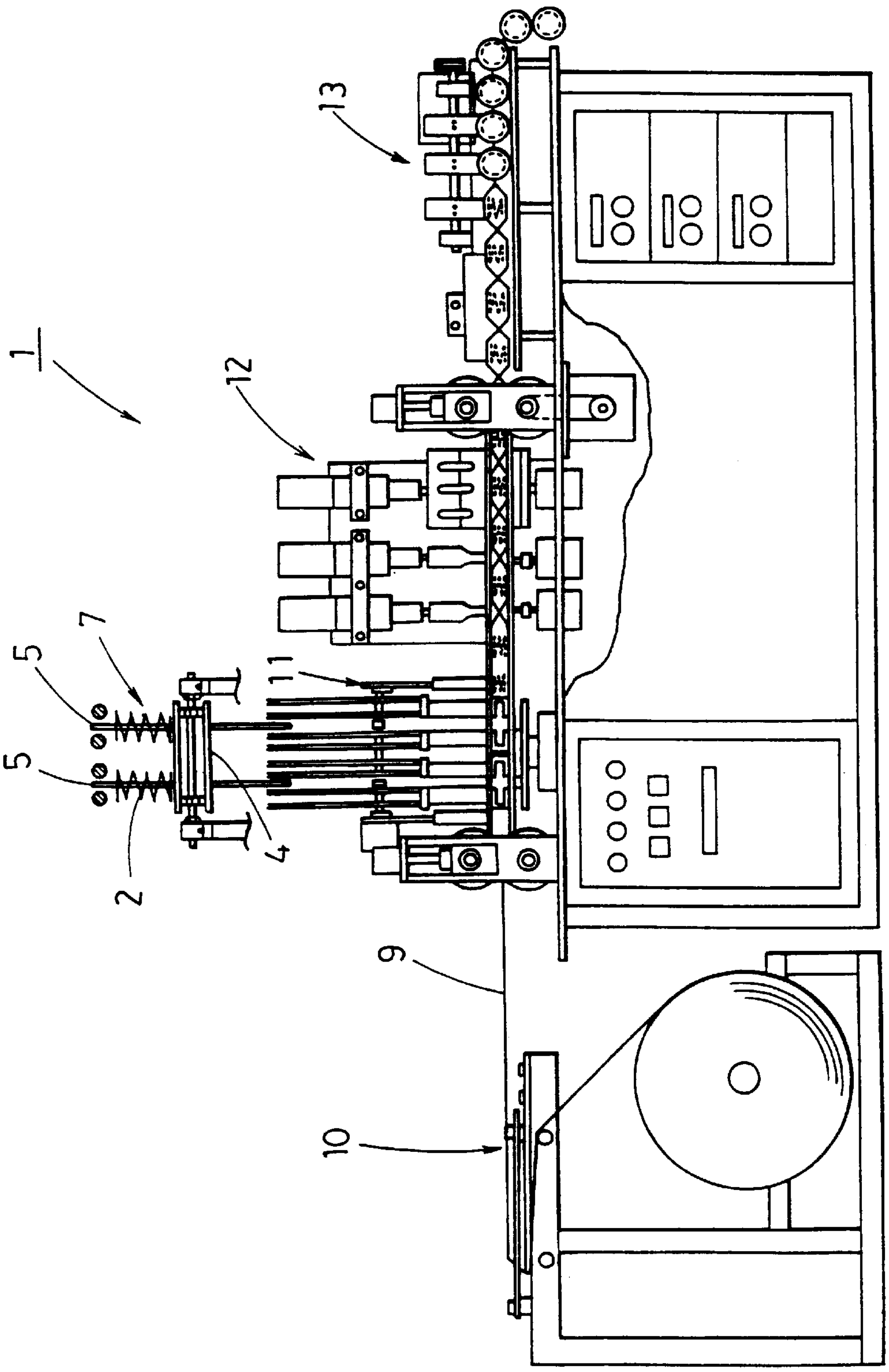
FIG. 2 is a front view of the same.

FIG. 1 is a schematic side view of an inner spring producing apparatus and FIG. 2 is a front view of the same. Numeral 1 in the illustration shows the entirety of the inner spring producing apparatus.

The inner spring producing apparatus 1 comprises a coil spring producing section 3 for forming coil springs 2 from a wire; a coil spring feeding section 6 for feeding the coil springs 2 fed from the coil spring producing section 3 to coil spring supporting bars 5 embedded in a conveyer 4; a conveying section 7 including the conveyer 4 for conveying the coil springs 2 fed from the coil spring feeding section 6, and including the supporting bars 5; a hardening-and-cooling section 8 for successively hardening the coil springs 2 and cooling them by blowing in the process of conveyance; a sheet feeding section 10 for feeding a double folded sheet 9 in which the coil springs 2 are inserted; a compression-and-insertion section 11 for compressing the coil springs 2 as hardened and cooled and inserting them in between the double folded sheet 9; a bonding section 12 for bonding the double folded sheet 9 inserting therein the coil springs 2 together, to form generally rectangular sheet casings which are the coil springs 2; a coil spring arraying section 13 by which the coil springs 2 compressed vertically in the sheet casings are laid down longitudinally with respect to the casings so that the coil springs can be presented in an array and be freed from the compression; and a control mechanism 14 for controlling the whole apparatus.

Figure 3:
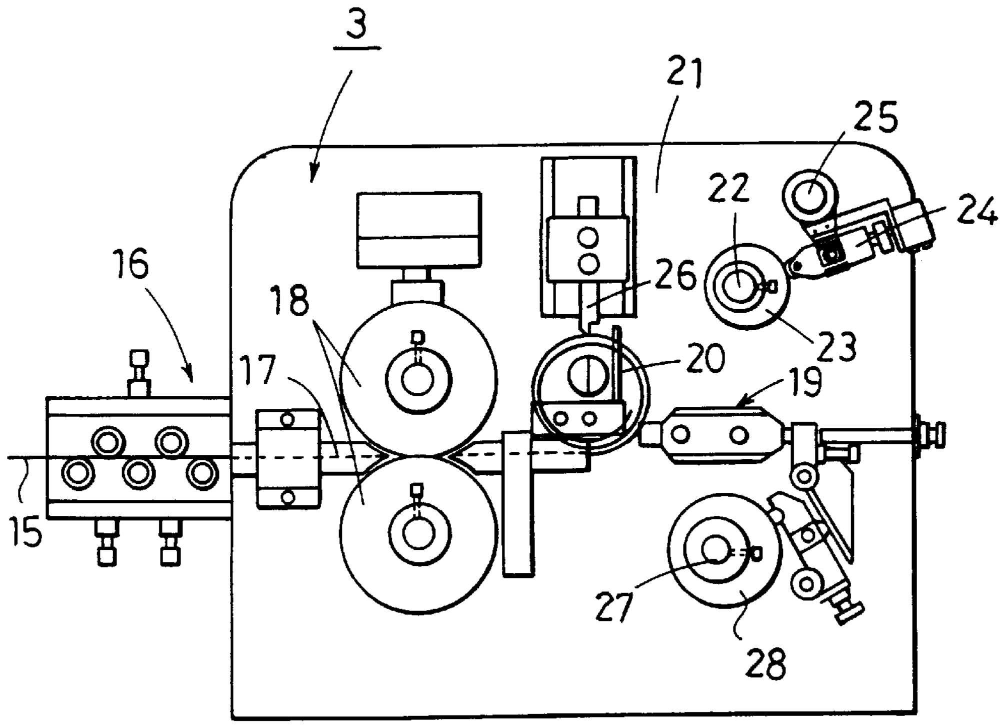
FIG. 3 is a front view of a coil spring forming portion of the inner spring producing apparatus.

The respective sections will be explained with reference to the producing process of the coil springs. In the coil spring producing section 3, as shown in FIG. 3, after a warp or distortion in a wire 15 fed from one side of the coil spring producing section 3 is corrected by correcting means 16, the wire 15 is fed through a wire guide 17 to a round tool 19 via a pair of wire feed rollers 18 and is formed into a circular-arc form thereat. Then, the wire 15 formed into the circular-arc form is pressed at one end thereof by a pitch tool 20 so as to be formed into coils having prescribed pitches. The pitch tool 20 also acts as a device for making changes in pitch of the coil springs.

The pitches of the coils thus successively formed are set in the following manner. First, an operating shaft 25 is rotated by a pitch adjuster 24 which is shifted in sliding contact with a profile of a pitch adjusting eccentric cam 22. The cam 22 is assembled to a shaft 23 rotatably pivoted by a frame 21 of a part of the coil spring producing section 3. When the operating shaft 25 is rotated, the pitch tool 20 is swung back and forth (as viewed in FIG. 3) in association with the rotation of the shaft 25, so as to change a pressing force of the pitch tool 20 to the wire 15.

Figure 4:
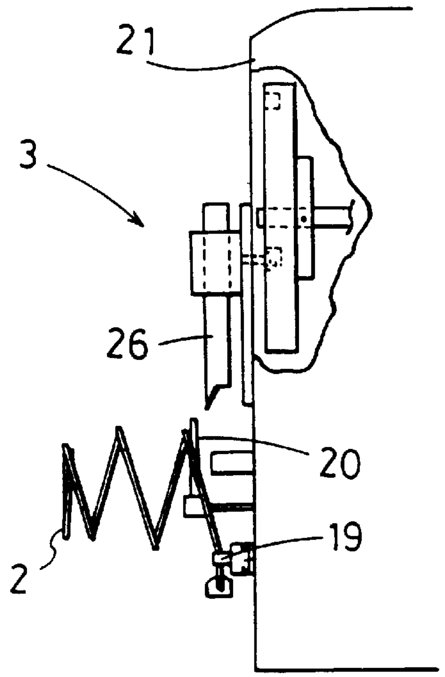
FIG. 4 is a side view showing a producing process of the coil springs in the coil spring forming portion of the inner spring producing apparatus.
Figure 5:
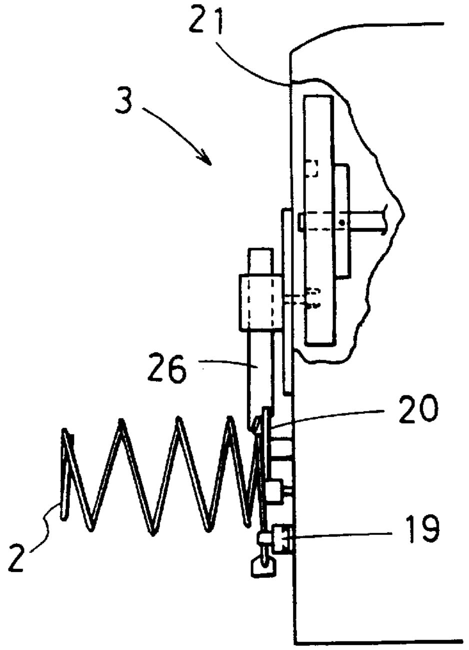
FIG. 5 is a side view showing a producing process of the coil springs in the coil spring forming portion of the inner spring producing apparatus.

When the pressing force of the pitch tool 20 to the wire 15 is strong, the coil spring 2 will have a large pitch (and larger height) and thus an increased repulsion, as shown in FIG. 4. When the pressing force is decreased, the coil spring 2 will have a small pitch (and smaller height) or zero pitch (no gap between the coils) and thus a decreased repulsion, as shown in FIG. S. When the pressing force of the pitch tool 20 to the wire 15 is reduced to zero, the end of the coil spring 2 cut by a cutter 26 will be located inside of the coil spring. The pitch of the coil springs can be variously changed by changing the position of the pitch adjuster 24 in the course of producing the coil springs.

Figure 6:
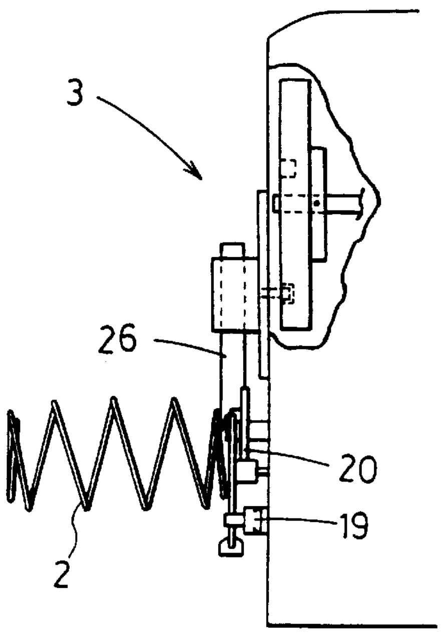
FIG. 6 is a side view showing a producing process of the coil springs in the coil spring forming portion of the inner spring producing apparatus.
Figure 7:
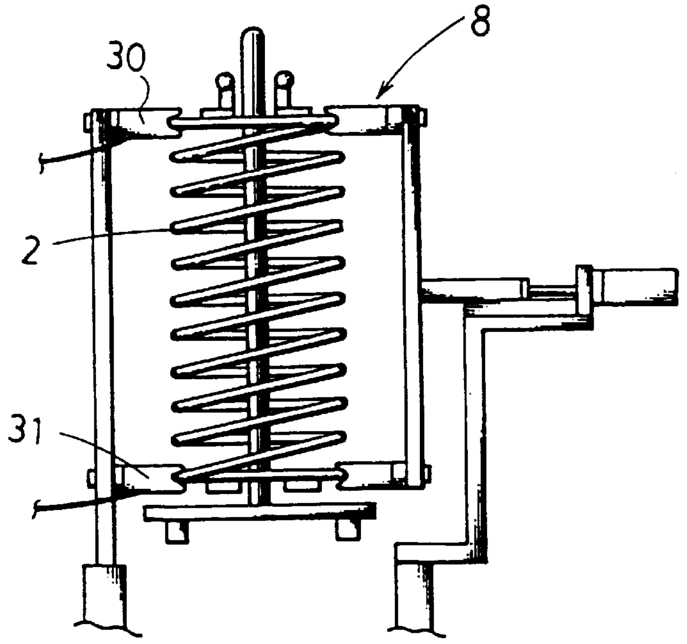
FIG. 7 is a front view schematically showing a hardening device of the inner spring producing apparatus.

The round tool 19 is moved rightward or leftward in FIG. 3 in a swinging manner via an eccentric cam 28 which is assembled on a coil diameter adjusting shaft 27 and pivoted on the frame 21 of a part of the coil spring producing section 3. When the round tool 19 is moved leftward, the coil spring 2 formed will have a reduced outer diameter; and when the round tool 19 is moved rightward, the coil spring 2 will have an increased outer diameter. Thus, when the round tool 19 is successively moved during the manufacturing of the coil springs 2, the coil spring 2 of a barrel shape as shown in FIG. 6 or a hand-drum shape as opposed to the barrel shape, not shown, can be formed with ease. In addition, coil springs having uniform diameters, as shown in FIG. 7, can also be formed.

The coil springs 2 formed in the coil spring producing section 3 are cut with the cutter 26. The coil springs 2 thus cut with the cutter 26 are fed to the conveyer 4 of the conveying section 7 from a feeding guide 29 in front of it. The coil springs 2 fed to the conveyer 4 of the conveying section 7 are hardened and cooled by the hardening-and-insertion section 8 on their way to the compression-and-insertion section 11.

The hardening-and-cooling section 8 comprises electrodes 30, 31 and a blower 32. The electrodes 30, 31 are brought into contact with the coil springs 2 at upper and lower portions thereof. The electrodes 30, 31 pass a current through the coil springs 2 so that the coil springs can be heated and thus hardened, as shown in FIG. 7. After being hardened, the coil springs 2 are cooled down to a generally atmospheric temperature by the blower 32 for sending air to the coil springs 2. Then the coil springs 2 are fed to the following compression-and-insertion section 11.

A detailed description on how the coil springs are hardened in the hardening-and-cooling section 8 will be given below. The data on the number (Z) of coil springs 2 forming each row of inner springs 40 and the data on the voltage and electric current feeding time required for the $1^{st}$ to a $K^{th}$ coil springs 2 to be energized for hardening; the voltage and electric current feeding time required for the $K^{th}$ +1 to a $N^{th}$ coil springs 2 to be energized for hardening; the voltage and electric current feeding time required for the $N^{th}$+1 to a $X^{th}$ coil springs 2 to be energized for hardening; the voltage and electric current feeding time required for the $X^{th}$+1 to a $Y^{th}$ coil springs 2 to be energized for hardening; and the voltage and electric current feeding time required for the $Y^{th}$ +1 to a $Z^{th}$ coil springs 2 to be energized for hardening are entered in advance into the electric current control circuits and the electric-current feeding time setting circuits which comprise a plurality of timers. The coil springs 2 are hardened on the basis of that input data.

The coil springs 2 fed from the hardening-and-cooling section 8 to the casing insertion section 11 are compressed by a spring press-in section 11 so as to be inserted between doubled sheets. The casings are sealed at their portions between the coil springs 2 by a vertical sealing section 12.

Figure 8:
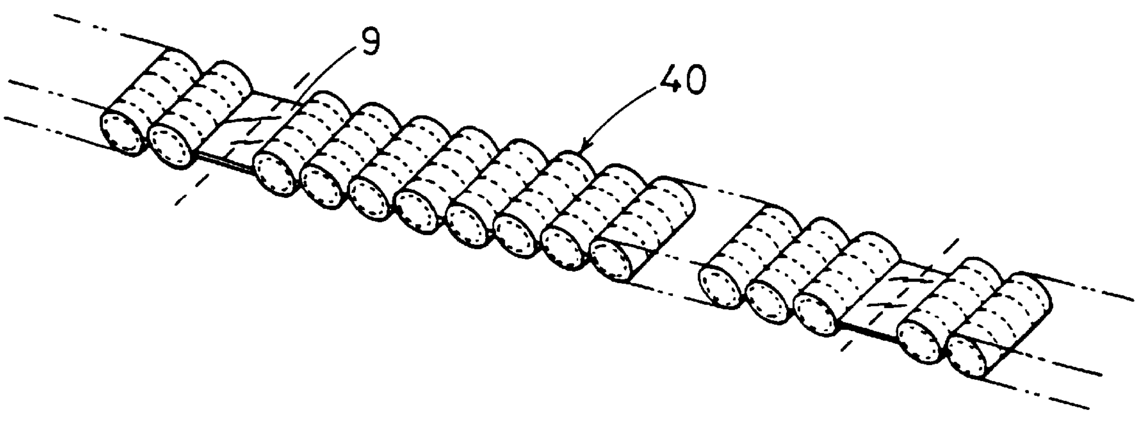
FIG. 8 is a perspective view of inner springs produced by the inner spring producing apparatus.
Figure 9:
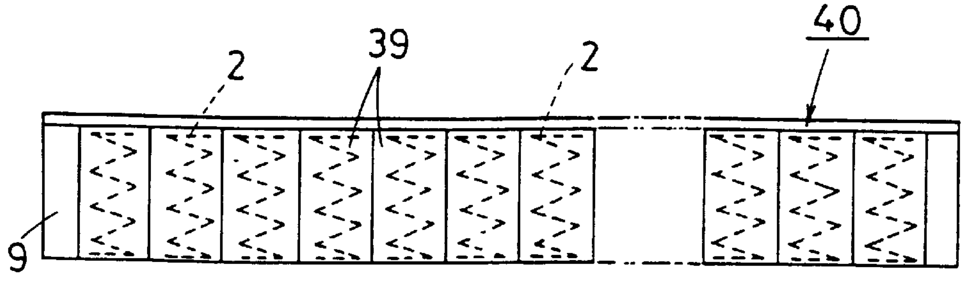
FIG. 9 is a side view of the inner springs produced by the inner spring producing apparatus.

Thereafter, insertion openings of the casings are sealed by a horizontal sealing section 12, and then the coiled springs 2 compressed vertically in the sheets are laid down longitudinally with respect to the casings and arrayed in order in the arraying section. Thus, a row of inner springs 40, in which the coil springs 2 are inserted one in the cylindrical spring casings 39, is manufactured, as shown in FIGS. 8 and 9.

Figure 10:
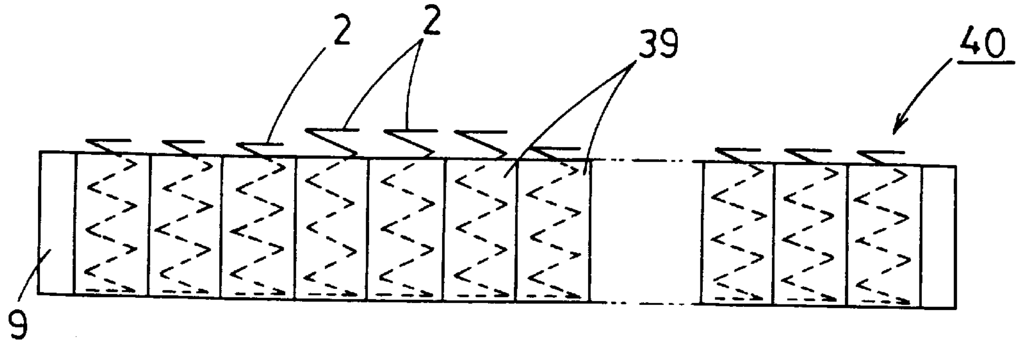
FIG. 10 is a side view of the inner springs produced by the inner spring producing apparatus, when released from their cased condition.

The coil springs 2 having an even number of turns (or coils) but different pitches are then inserted in the cylindrical spring casings 39 of even length. If the spring casings 39 are opened at their insertion openings, the coil springs 2 having larger pitches (and larger heights) and thus strong repulsion will project greatly from the insertion openings when not confined by the casings (i.e., when in a free state), as shown in FIG. 10.

Figure 11:
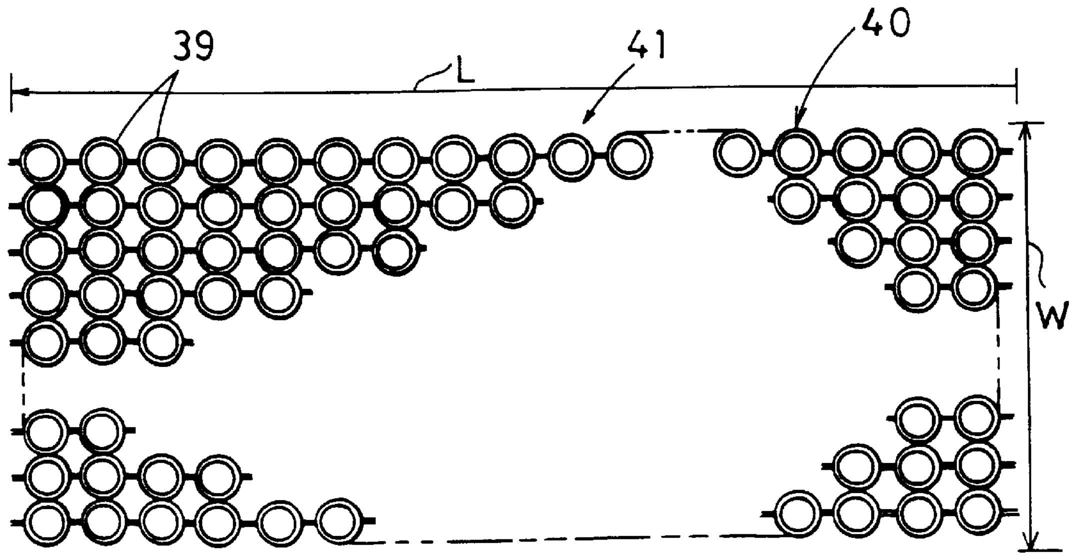
FIG. 11 is a plan view of the inner springs produced by the inner spring producing apparatus, as aligned in the lengthwise direction and connected with each other.

In the row of inner springs 40 thus hardened, the coil springs are partly varied in repulsion by making their pitches different, as mentioned above. Accordingly, when inner spring rows 40 are connected via adhesive or hook rings to have a length extending in the widthwise direction, as shown in FIG. 11, so as to form a mattress 41 of a bed, the mattress 41 will have resilient forces partly varied with respect to the lengthwise direction L of the mattress 41.

Figure 12:
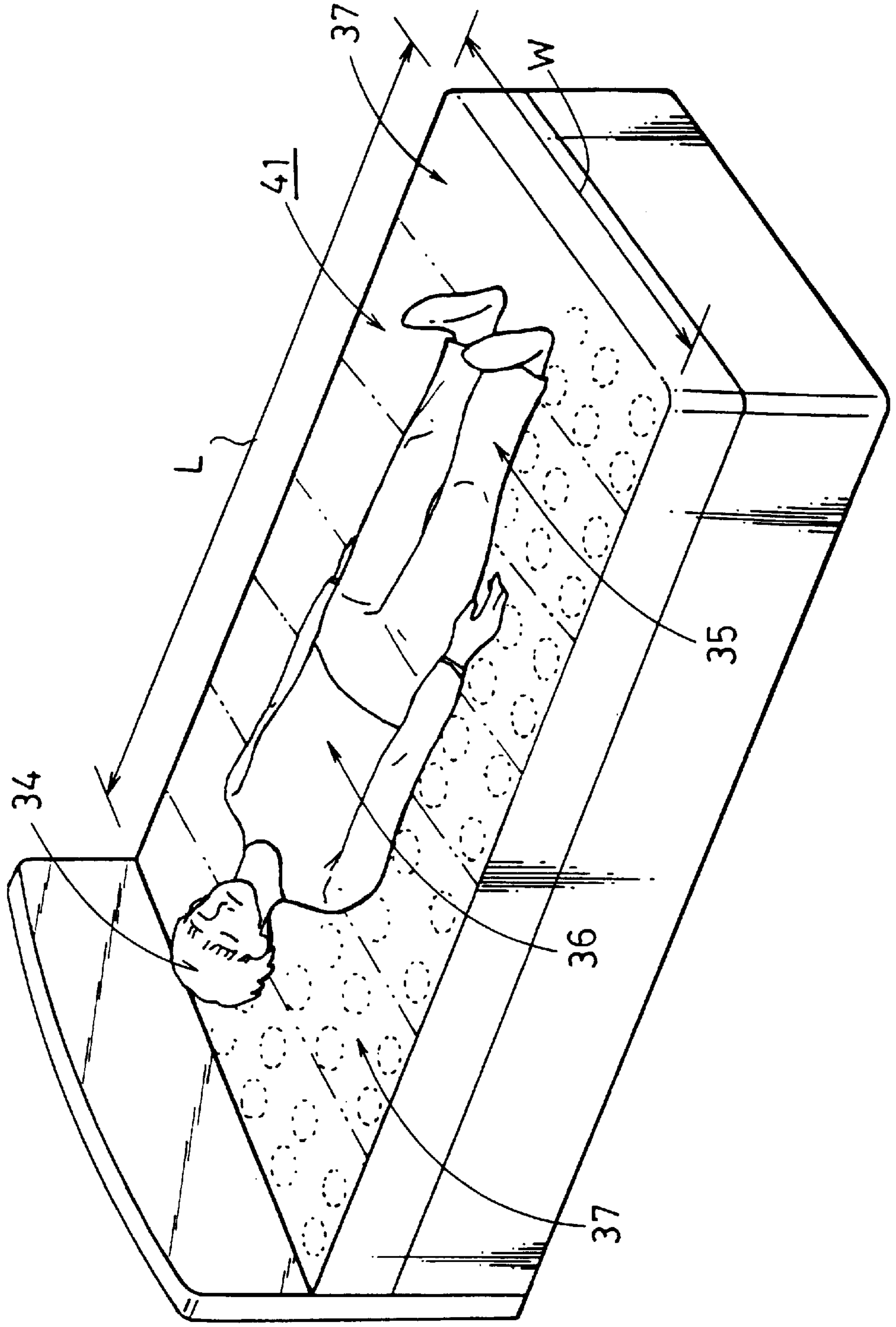
FIG. 12 is a perspective view of a mattress of a bed formed by the inner springs being connected with each other.

This enables the mattress to have a small resilient force at its portions 34 and 35 corresponding to the head and legs; a large resilient force at its portion 36 corresponding to the trunk; and a smallest resilient force at the remaining portions 37, as shown in FIG. 12, to be well suited for the distribution of weight.

Although the mattress 41 of the bed such as that shown in FIG. 12 has a variety of sizes, including the so-called single size, semi-double size, double size, queen size and king size, it commonly has a substantially uniform lengthwise dimension of about 2 m. Accordingly, the rows of inner springs being arranged in parallel in the longitudinal direction, as in the example of the invention, enables the width W to be changed with efficiency by simply adding or removing a row of cased inner springs to be connected, without the need for changing the length L of a row of cased inner springs, as in the conventional mattress.

Figure 13:
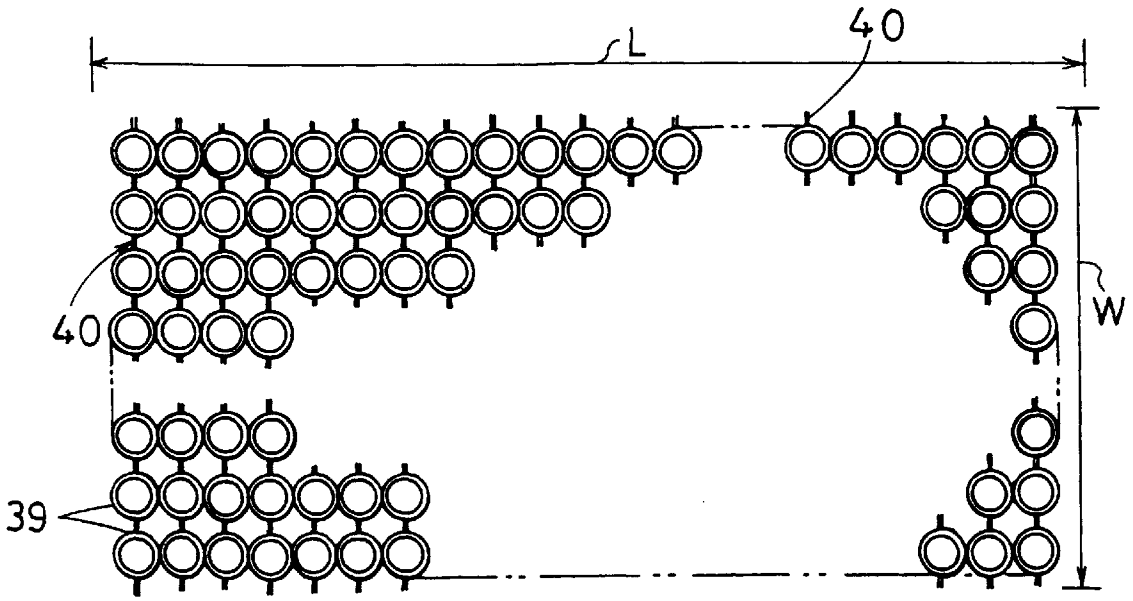
FIG. 13 is a plan view of the inner springs produced with the inner spring producing apparatus, as aligned in the widthwise direction and connected with each other.

The mattress 41 of the bed as shown in FIG. 12 may be formed by the inner spring rows 40 of the invention being arranged in parallel not only in the lengthwise direction but also in the widthwise direction as shown in FIG. 13.

This embodiment of the invention includes the process of the coil springs being hardened and then cooled down, but the hardening/cooling process may, of course, be omitted.

Further, in this embodiment of the invention, the respective sections of the inner spring producing apparatus are arranged in series from the coil spring producing section to the casing insertion section. However, those sections may, of course, be separated so that the respective processes can be done in different places.

In addition, the inner spring rows, which in illustration are explained by using the application to the mattress of a bed as an example, may, of course, be applied to sofas or seats used in, for example, trains and motorcars, without limiting to the examples above.

As discussed above, the invention is constructed so that the repulsion (resilience) of the coil springs can be varied by varying the pitches (and therefore, heights) of the coil springs to be encased in a predetermined number of spring casing portions. This construction enables a mattress of a bed, for example, to have partly varied repulsion with respect to a widthwise direction of the mattress of the bed by simply arranging the coil springs of different repulsion in place in the inner springs. This enables the inner springs of partly different repulsion to be successively produced, thus providing the advantageous effect of providing improved productivity with significantly reduced manufacturing costs.

Also, since the coil springs having the resiliency suitable for the distribution of weight exerted on the mattress of the bed can be produced with ease, the fatigue of the mattress can be prevented as permanently as possible. This can provide the advantageous effect of providing an improved durability of bedding and furniture and, thus, an improved quality of goods is provided.

In addition, the repulsion of the coil springs can be varied simply by changing the pitches (and heights) of the coil springs by means of the pitch setting means, thus a varied resiliency of the coil springs in the inner springs can be achieved even by the conventional type of inner spring producing apparatus having no energizing type hardening device.

With the inner spring producing apparatus having the energizing type hardening device, the difference in repulsion can be further increased by using the pitch setting means in combination with the energizing type hardening device.

Further, since the repulsion of the coil springs can be varied simply by changing the pitches of the coil springs by means of the pitch setting means, only one kind of inner spring producing apparatus is needed and only one kind of wire rod to be worked is needed. This can provide the advantageous effect of eliminating the need for a large space in a work shop for installation of machines, storage of a variety of wire rods and the like.

In addition, since the coil springs set at different resilient forces by the pitch setting means are inserted in the spring casing portions in the order in which they are set at different resilient forces, the need for each of the coil springs separately produced by several coil spring producing apparatus being adequately controlled, as in the prior art, can be eliminated. Also, since the miss-casing of the coil springs in the spring casing portions of the cylindrical casings can be prevented, the advantageous effect of providing significantly improved reliability of the bedding, such as beds, and furniture is produced.

What is claimed is:

1. An inner spring assembly comprising:

at least one cylindrical spring casing having parallel casing portions; and a plurality of coil springs having identical outer diameters and being encased in said at least one cylindrical spring casing, each of said plurality of coil springs having a longitudinal axis and a uniform outer diameter and being arranged in one of said casing portions of said at least one cylindrical spring casing so as to form at least one row of coil springs having parallel longitudinal axes, wherein each of said at least one row of coil springs includes coil springs having different heights when said plurality of coil springs are in a free state.

2. The assembly of claim 1, wherein said plurality of coil springs includes coil springs having different pitches such that each of said at least one row of coil springs includes coil springs having different spring rates.

3. The assembly of claim 1, wherein each of said at least one row of coil springs includes at least one coil spring having a first pitch and at least one coil spring having a second pitch, wherein said first pitch is different than said second pitch.

4. An inner spring assembly comprising:

at least one cylindrical spring casing having parallel casing portions; and a plurality of coil springs formed of wire having an identical gauge and being encased in said at least one cylindrical spring casing, each of said plurality of coil springs having a longitudinal axis and a uniform outer diameter and being arranged in one of said casing portions of said at least one cylindrical spring casing so as to form at least one row of coil springs having parallel longitudinal axes, wherein each of said at least one row of coil springs includes coil springs having different heights when said plurality of coil springs are in a free state.

5. The assembly of claim 4, wherein each of said at least one row of coil springs includes at least one coil spring having a first pitch and at least one coil spring having a second pitch, wherein said first pitch is different than said second pitch.

6. An inner spring assembly comprising:

at least one cylindrical spring casing; and a plurality of coil springs having identical outer diameters and being encased in said at least one cylindrical spring casing, each of said plurality of coil springs having a uniform outer diameter, said plurality of coil springs being arranged in said at least one cylindrical spring casing so as to form at least one row of coil springs, said plurality of coil springs including a first group of coil springs each having a first pitch and a second group of coil springs each having a second pitch, said first pitch being different than said second pitch, wherein each of said at least one row of coil springs includes at least one coil spring from said first group and at least one coil spring from said second group.

7. An inner spring assembly comprising:

at least one cylindrical spring casing; and a plurality of coil springs formed of wire having an identical gauge and being encased in said at least one cylindrical spring casing, each of said plurality of coil springs having a uniform outer diameter, said plurality of coil springs being arranged in said at least one cylindrical spring casing so as to form at least one row of coil springs, said plurality of coil springs including a first soup of coil springs each having a first pitch and a second group of coil springs each having a second pitch, said first pitch being different than said second pitch, wherein each of said at least one row of coil springs includes at least one coil spring from said first group and at least one coil spring from said second group.

* * * * *